Patented Dec. 15, 1931

1,836,020

UNITED STATES PATENT OFFICE

HELMUTH FREYTAG, OF MANNHEIM, GERMANY, ASSIGNOR TO I. G. FARBENINDUSTRIE AKTIENGESELLSCHAFT, OF FRANKFORT-ON-THE-MAIN, GERMANY

EXTRACTION OF VALUABLE PRODUCTS FROM MONTAN WAX

No Drawing. Application filed February 15, 1930, Serial No. 428,835, and in Germany March 2, 1929.

The present invention relates to improvements in the extraction of valuable products from Montan wax.

For the purpose of recovering the valuable constituents contained in Montan wax such as the so-called wax acids, wax esters and the like, it has already been proposed to free the crude Montan wax from resins and the like and then to dissolve out the valuable constituents from the deresinified material by extraction with organic solvents. This process has the objection however that those solvents which only dissolve the acids and esters and not the difficultly soluble colored constituents give very small yields whereas those solvents which give high yields at the same time dissolve colored constituents and thus yield products of small value.

I have now found that the yields of very valuable products, when employing solvents, which dissolve the wax acids and the wax esters but which do not dissolve the difficultly soluble colored constituents, can be considerably increased and in some cases an improvement in the quality of the products can be effected by carrying out the extraction of the crude or deresinified Montan wax at superatmospheric pressure and at temperatures which lie above the normal boiling points (i. e. those at atmospheric pressure) of the solvents employed. Suitable solvents are those of aliphatic nature for example alcohols, such as methyl, ethyl or propyl alcohols, ketones, for example acetone, ethers, such as diethyl ether, esters, for example the acetic esters of the aforesaid alcohols, liquid hydrocarbons of open chain or cyclic aliphatic nature such as benzines or hexahydrobenzene, chlorinated hydrocarbons and the like as such or in admixture with each other or mixtures with other solvents containing however a preponderating quantity of the solvents specified above. The temperatures and pressures to be employed vary and depend entirely on the solvents selected, but the pressures should not be too high, say not above about 50 atmospheres, in order to avoid the cost of special apparatus.

The process may be carried out for example in such a manner that the crude or deresinified Montan wax is heated in an autoclave together with one or a mixture of the solvents hereinbefore specified with or without stirring, the still half liquid crystal pulp consisting of the valuable constituents, which separates out after cooling the solution, being removed from the residue which remains undissolved. In order to effect a better utilization of the solvent it may be allowed to pass in countercurrent through a series of autoclaves in such a manner that the fresh solvent always comes into contact with the most completely extracted Montan wax and the most enriched solvent with the fresh Montan wax. Furthermore the operation may be rendered continuous by working in a pressure tight washing column which is provided inside with sieves, Raschig rings or the like and which is surrounded outside by a heating jacket. When adopting this method of working liquefied Montan wax is introduced in a continuous stream into the top of the column and the solvent under the desired pressure is led in at the bottom of the column, the arrangement being reversed when employing solvents having a higher specific gravity than that of Montan wax. The solution obtained at the end of the extraction is cooled in cases when non-deresinified crude Montan wax has been employed, the resin solution being separated after crystallization of the wax constituents. On the other hand when deresinified Montan wax has been employed the pressure on the liquid obtained after extraction is released, whereby the greater part of the solvent is caused to evaporate and the remainder is removed by distillation.

The product obtained according to the present invention is distinguished in contrast to the deresinified, and especially in contrast to the non-deresinified, Montan wax by a paler color and by the greater readiness with which it can be refined, for example by bleaching by physical and/or chemical processes.

The following examples will further illustrate the nature of this invention, but the invention is not restricted to these examples. The parts are by weight.

Example 1

10 parts of crude Montan wax are treated in an autoclave at a temperature of 150° centrigrade and at a pressure of about 12 atmospheres several times consecutively, each time with 50 parts of a mixture of benzene and ethyl alcohol in the ratio of 1:4. The entire extract is cooled, and the precipitated wax crystals are then separated from the resin solution, the solvent still adhering to the crystals being then evaporated. 5 parts of a pale brown wax are obtained.

Example 2

Molten deresinified Montan wax is introduced in a continuous stream into the top of a column which is provided inside with sieves Raschig rings or the like and which is surrounded with a heating jacket outside, while methanol heated to 135° centigrade and under the corresponding pressure of about 9 atmospheres is pumped in at the bottom so that the washing process is carried out at 135° centigrade. The pressure on the methyl alcoholic solution leaving at the top is released and in this manner the greater part of the methanol is caused to evaporate the remainder being removed by distillation. A yield of about 40 per cent of a readily refinable wax is obtained which is paler than the product obtainable according to Example 1.

What I claim is:—

1. The process for extracting valuable products from Montan wax which comprises treating Montan wax at superatmospheric pressure while heating with an organic solvent dissolving the wax acids and wax esters of Montan wax but no coloring material contained in the said wax.

2. The process for extracting valuable products from Montan wax which comprises treating Montan wax at superatmospheric pressure while heating with an organic solvent comprising a preponderating quantity of an organic solvent of aliphatic nature.

3. The process for extracting valuable products from Montan wax which comprises treating Montan wax with an organic solvent comprising a preponderating quantity of an organic solvent of aliphatic nature, at superatmospheric pressure and at a temperature above the normal boiling point of the said solvent.

4. The process for extracting valuable products from Montan wax which comprises treating Montan wax in countercurrent with an organic solvent comprising a preponderating quantity of an organic solvent of aliphatic nature, at superatmospheric pressure and at a temperature above the normal boiling point of the said solvent.

5. The process for extracting valuable products from Montan wax which comprises treating liquefied Montan wax in countercurrent with an organic solvent comprising a preponderating quantity of an organic solvent of aliphatic nature, at superatmospheric pressure and at a temperature above the normal boiling point of the said solvent.

6. The process for extracting valuable products from Montan wax which comprises treating Montan wax containing resinous matter with an organic solvent comprising a preponderating quantity of an organic solvent of aliphatic nature, at superatmospheric pressure and at a temperature above the normal boiling point of the said solvent, separating the solution, cooling it and separating the crystalline precipitate formed from the solution.

7. The process for extracting valuable products from Montan wax which comprises treating Montan wax with an organic solvent of aliphatic nature, at superatmospheric pressure while heating.

8. The process for extracting valuable products from Montan wax which comprises treating Montan wax with an organic solvent of aliphatic nature, at superatmospheric pressure and at a temperature above the normal boiling point of the said solvent.

9. The process for extracting valuable products from Montan wax which comprises treating deresinified Montan wax with an organic solvent of aliphatic nature, at superatmospheric pressure and at a temperature above the normal boiling point of the said solvent, separating the solution, cooling it, separating the crystalline precipitate formed from the solution and evaporating the latter.

10. The process for extracting valuable products from Montan wax which comprises treating Montan wax with an organic solvent comprising a preponderating quantity of a low member of the aliphatic alcohol series, at superatmospheric pressure and at a temperature above the normal boiling point of the said solvent.

11. The process for extracting valuable products from Montan wax which comprises treating Montan wax with an organic solvent comprising a preponderating quantity of ethyl alcohol at superatmospheric pressure and at a temperature above the normal boiling point of the said solvent.

12. The process for extracting valuable products from Montan wax which comprises treating Montan wax with an organic solvent comprising a preponderating quantity of ethyl alcohol and benzene at superatmospheric pressure and at a temperature above the normal boiling point of the said solvent.

13. The process for extracting valuable products from Montan wax which comprises treating Montan wax with ethyl alcohol at superatmospheric pressure and at a temperature above the normal boiling point of the said solvent.

In testimony whereof I have hereunto set my hand.

HELMUTH FREYTAG.